US008848875B2

(12) United States Patent
Hunt et al.

(10) Patent No.: US 8,848,875 B2

(45) Date of Patent: Sep. 30, 2014

(54) ENHANCED BARRIER FOR LIQUID METAL BEARINGS

(75) Inventors: Ian Strider Hunt, Milwaukee, WI (US); Donald Robert Allen, Waukesha, WI (US); Kenwood Dayton, Milwaukee, WI (US); Andrew Triscari, Milwaukee, WI (US)

(73) Assignee: General Electric Company, Schenectady, NY (US)

( * ) Notice: Subject to any disclaimer, the term of this patent is extended or adjusted under 35 U.S.C. 154(b) by 398 days.

(21) Appl. No.: 12/915,898

(22) Filed: Oct. 29, 2010

(65) Prior Publication Data

US 2012/0106712 A1 May 3, 2012

(51) Int. Cl.
*H01J 35/02* (2006.01)
*B23P 11/00* (2006.01)
*H01J 35/10* (2006.01)

(52) U.S. Cl.
CPC ......... *H01J 35/101* (2013.01); *H01J 2235/106* (2013.01); *H01J 2235/1086* (2013.01)
USPC ........................................... 378/132; 378/133

(58) Field of Classification Search
CPC .............. H01J 2235/106; H01J 35/101; H01J 2235/1086
USPC .................................................. 378/133, 132
See application file for complete search history.

(56) References Cited

U.S. PATENT DOCUMENTS 3,836,214 A 9/1974 Gengard et al.
4,736,400 A 4/1988 Koller et al.
5,077,776 A 12/1991 Vetter
5,210,781 A * 5/1993 Ono et al. .................... 378/125
5,654,999 A 8/1997 Gemmel et al.
6,192,107 B1 * 2/2001 Price et al. .................... 378/130
6,456,693 B1 9/2002 Ratzmann et al.
6,980,628 B2 12/2005 Wang et al.
7,020,244 B1 3/2006 Wilson et al.
7,164,751 B2 1/2007 Weil
7,283,864 B2 10/2007 Thomas et al.
7,286,643 B2 10/2007 Hebert et al.
7,321,653 B2 1/2008 Hockersmith et al.
7,450,690 B2 11/2008 Block et al.
7,496,180 B1 2/2009 Subraya et al.
7,519,157 B2 4/2009 Hockersmith et al.
7,522,707 B2 4/2009 Steinlage et al.
7,558,375 B2 7/2009 Schaefer et al.

(Continued)

FOREIGN PATENT DOCUMENTS

WO 2010046837 4/2010
WO 2010061323 6/2010

*Primary Examiner* — Allen C. Ho
*Assistant Examiner* — Danielle Fox
(74) *Attorney, Agent, or Firm* — Fletcher Yoder, P.C.

(57) ABSTRACT

The present disclosure is directed towards the prevention of high voltage instabilities within X-ray tubes. For example, in one embodiment, an X-ray tube is provided. The X-ray tube generally includes a stationary member, and a rotary member configured to rotate with respect to the stationary member during operation of the X-ray tube. The X-ray tube also includes a liquid metal bearing material disposed in a space between the shaft and the sleeve, a seal disposed adjacent to the space to seal the liquid metal bearing material in the space, and an enhanced surface area material disposed on a side of the seal axially opposite the space and configured to trap within the enhanced surface area material liquid metal bearing material that escapes the seal.

20 Claims, 4 Drawing Sheets

(56) References Cited

U.S. PATENT DOCUMENTS

| | | | |
|---|---|---|---|
| 7,583,791 | B2 | 9/2009 | Hockersmith et al. |
| 7,643,614 | B2 | 1/2010 | Hebert et al. |
| 7,668,298 | B2 | 2/2010 | Subraya et al. |
| 7,672,433 | B2 | 3/2010 | Zhong et al. |
| 7,720,200 | B2 | 5/2010 | Steinlage et al. |
| 7,796,737 | B2 | 9/2010 | Allen et al. |
| 7,809,101 | B2 | 10/2010 | Frutschy et al. |
| 7,869,572 | B2 | 1/2011 | Allen et al. |
| 7,869,574 | B2 | 1/2011 | Steinlage et al. |
| 7,903,786 | B2 | 3/2011 | Zhong et al. |
| 7,933,382 | B2 | 4/2011 | Hunt et al. |
| 7,974,384 | B2 | 7/2011 | Legall et al. |
| 8,116,432 | B2 | 2/2012 | Steinlage et al. |
| 8,121,259 | B2 | 2/2012 | Hebert et al. |
| 8,270,562 | B2 | 9/2012 | Sainath et al. |
| 2005/0135561 | A1 | 6/2005 | Hebert et al. |
| 2005/0226386 | A1 | 10/2005 | Wang et al. |
| 2007/0007874 | A1 | 1/2007 | Block et al. |
| 2007/0041504 | A1 | 2/2007 | Hockersmith et al. |
| 2007/0071174 | A1 | 3/2007 | Hebert et al. |
| 2008/0069306 | A1 | 3/2008 | Hockersmith et al. |
| 2008/0101541 | A1 | 5/2008 | Steinlage et al. |
| 2008/0107238 | A1 | 5/2008 | Steinlage et al. |
| 2008/0260102 | A1 | 10/2008 | Steinlage et al. |
| 2008/0260105 | A1 | 10/2008 | Schaefer et al. |
| 2009/0052627 | A1 | 2/2009 | Subraya et al. |
| 2009/0060140 | A1 | 3/2009 | Subraya et al. |
| 2009/0080615 | A1 | 3/2009 | Hebert et al. |
| 2009/0086919 | A1 | 4/2009 | Steinlage et al. |
| 2009/0245469 | A1 * | 10/2009 | Ito et al. ........................ 378/133 |
| 2009/0279668 | A1 | 11/2009 | Allen et al. |
| 2009/0279669 | A1 | 11/2009 | Allen et al. |
| 2009/0285363 | A1 | 11/2009 | Zhong et al. |
| 2009/0304158 | A1 | 12/2009 | Frutschy et al. |
| 2010/0046717 | A1 | 2/2010 | Zhong et al. |
| 2010/0092699 | A1 | 4/2010 | Steinlage et al. |
| 2010/0128848 | A1 | 5/2010 | Qiu et al. |
| 2010/0246773 | A1 | 9/2010 | Hunt et al. |
| 2010/0260323 | A1 | 10/2010 | Legall et al. |
| 2011/0007872 | A1 | 1/2011 | Steinlage et al. |
| 2011/0135067 | A1 | 6/2011 | Hebert et al. |
| 2011/0150174 | A1 | 6/2011 | Sainath et al. |
| 2011/0176659 | A1 | 7/2011 | Rogers |

* cited by examiner

ENHANCED BARRIER FOR LIQUID METAL BEARINGS

BACKGROUND OF THE INVENTION

The subject matter disclosed herein relates to the maintenance of X-ray tube voltages, and, more specifically, to features for capturing liquid metal within X-ray tubes.

A variety of diagnostic and other systems may utilize X-ray tubes as a source of radiation. In medical imaging systems, for example, X-ray tubes are used in projection X-ray systems, fluoroscopy systems, tomosynthesis systems, and computer tomography (CT) systems as a source of X-ray radiation. The radiation is emitted in response to control signals during examination or imaging sequences. The radiation traverses a subject of interest, such as a human patient, and a portion of the radiation impacts a detector or a photographic plate where the image data is collected. In conventional projection X-ray systems the photographic plate is then developed to produce an image which may be used by a radiologist or attending physician for diagnostic purposes. In digital X-ray systems a digital detector produces signals representative of the amount or intensity of radiation impacting discrete pixel regions of a detector surface. In CT systems a detector array, including a series of detector elements, produces similar signals through various positions as a gantry is displaced around a patient.

The X-ray tube is typically operated in cycles including periods in which high voltages are generated between certain components (e.g., when X-rays are generated), interleaved with periods in which lower voltages are being used (e.g., the X-ray tube is not generating X-ray radiation). As an example, in a typical configuration, a high voltage is generated between a cathode, which generates an electron beam, and a target anode, which is struck by the electron beam. The high voltage serves to accelerate the electron beams towards the anode, and the electron bombardment results in the generation of X-rays. Accordingly, in situations where the high voltage is unstable, the X-ray tube may not be able to generate a suitable X-ray flux for imaging. In implementations where the X-ray tube is in a clinical setting, for example in the imaging systems described above, such instabilities can slow or altogether halt an imaging system's capability to perform patient examinations. There is a need, therefore, for an approach for limiting instability of the high voltage in X-ray tubes.

BRIEF DESCRIPTION OF THE INVENTION

In one embodiment, an X-ray tube is provided. The X-ray tube generally includes a stationary member and a rotary member configured to rotate with respect to the stationary member during operation of the X-ray tube. The X-ray tube also includes a liquid metal bearing material disposed in a space between the stationary member and the rotary member, a seal disposed adjacent to the space to seal the liquid metal bearing material in the space, and an enhanced surface area material disposed on a side of the seal axially opposite the space and configured to trap within the enhanced surface area material liquid metal bearing material that escapes the seal.

In another embodiment, an X-ray tube is provided. The X-ray tube generally includes a stationary member and a rotary member configured to rotate with respect to the stationary member during operation of the X-ray tube. The X-ray tube also includes a liquid metal bearing material disposed in a space between the shaft and the sleeve, a first seal disposed adjacent to a first end of the space to seal the liquid metal bearing material in the space, a second seal disposed adjacent to a second end of the space to seal the liquid metal bearing material in the space, a first ring disposed adjacent to the first seal and made of an enhanced surface area material to trap within the first ring liquid metal bearing material that escapes the first seal, and a second ring disposed adjacent to the first seal and made of an enhanced surface area material to trap within the second ring liquid metal bearing material that escapes the second seal.

In a further embodiment, a method for making an X-ray tube is provided. The method generally includes disposing a sleeve about a shaft, disposing a liquid metal bearing material in a space between the sleeve and the shaft, disposing a seal adjacent to at least one end of the space to seal the liquid metal bearing material in the space, and disposing an enhanced surface area material adjacent to the seal to trap within the enhanced surface area material liquid metal bearing material that escapes the seal.

In a further embodiment, a method for making an X-ray tube is provided. In an X-ray tube including a rotary member, a sleeve disposed about a stationary shaft, a liquid metal bearing material in a space between the rotary member and the shaft, and a seal disposed adjacent to at least one end of the space to seal the liquid metal bearing material in the space, the method includes disposing an enhanced surface area material adjacent to the seal to trap within the enhanced surface area material liquid metal bearing material that escapes the seal.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

As noted above, X-ray tubes often generate a high voltage between a cathode and an anode. The high voltage may serve to accelerate electrons from the cathode to the anode. Some X-ray tubes have a rotating anode disc, which allows different portions of the disc to be struck by the electron beam to disperse the thermal energy so generated. The anode disc may be supported in rotation by a bearing, such as a ball bearing or a spiral groove bearing that is lubricated by a liquid metal. Unfortunately, in situations where the bearing is placed under a load, such as when the X-ray tube rotates about a subject of interest on a gantry, a portion of the liquid metal lubricant material may escape the bearing and associated seals. The escaped liquid metal material may be in liquid, atomized, and/or vapor form, and may create high voltage instabilities within the tube. Accordingly, it is now recognized that improved approaches are needed for trapping liquid metal lubricant material that has escaped the bearings, such that the high voltage within the tube may be maintained. Typical methods for capturing escaped liquid metal are often unreliable and are not sufficient for capturing a suitable amount of liquid metal lubricant material so as to prevent high voltage instabilities. For example, typical approaches often do not trap any appreciable amount of atomized and/or vaporized liquid metal lubricant, and may not provide sufficient barrier properties to substantially completely contain the liquid metal lubricant.

The embodiments disclosed herein address these and other shortcomings of existing approaches by providing an enhanced surface area material that is capable of trapping liquid, atomized, and vaporized liquid metal bearing material. The enhanced surface area material may be disposed proximate to one or more seals of the X-ray tube, or may be formed as part of one or more seals of the X-ray tube, or both. The enhanced surface area material may include a mesh, felt, porous ring, wool, woven material, pressed/sintered material, or the like. In some embodiments, the enhanced surface area material acts as a physical barrier to prevent leakage of liquid metal bearing material. In further embodiments, the enhanced surface area material may also chemically interact with the liquid metal bearing material (e.g., may be a wettable material) to prevent leakage of the same.

Figure 1:
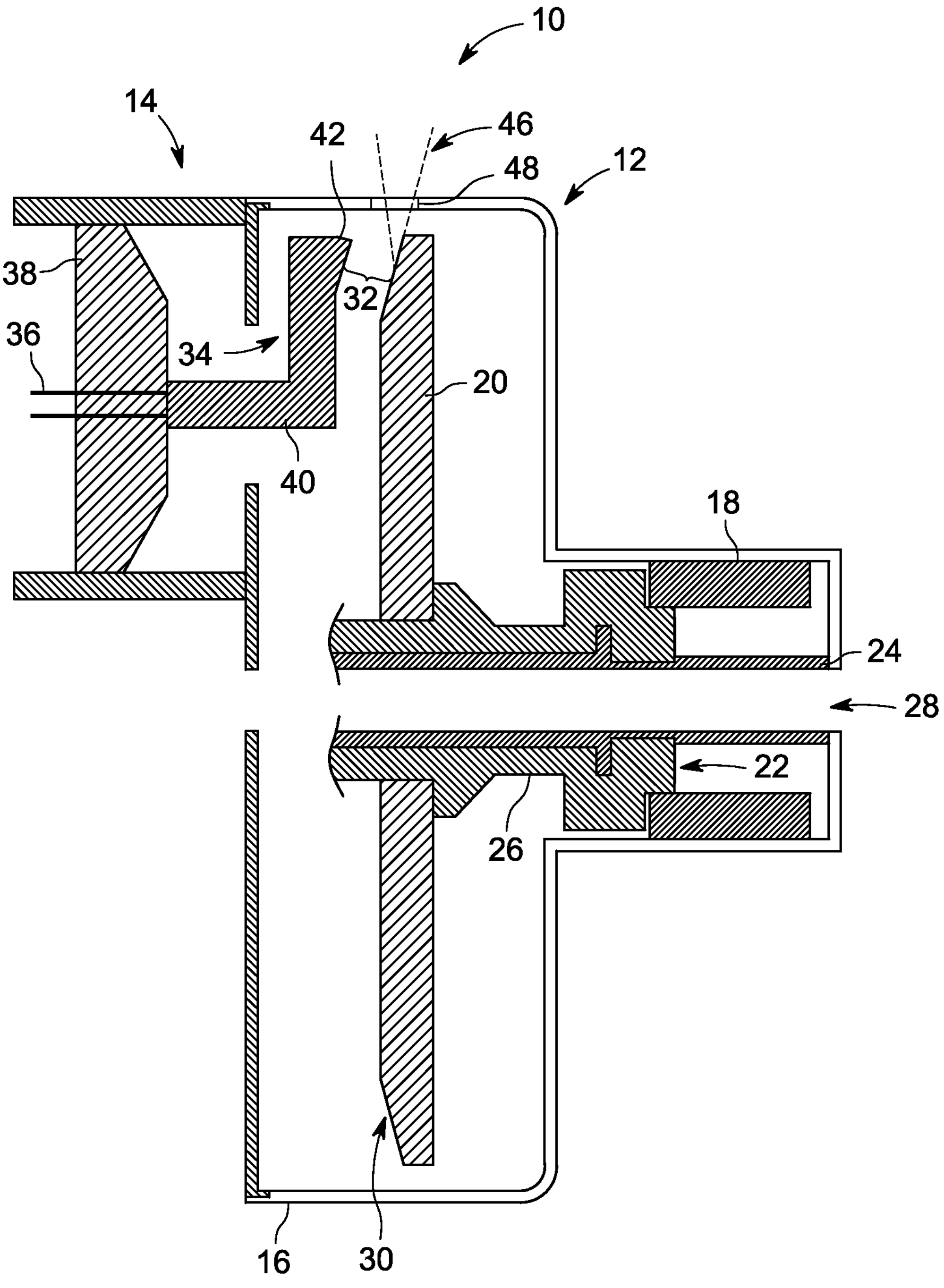
FIG. 1 is a diagrammatical illustration of an embodiment of an X-ray tube in which enhanced surface area materials may be used to prevent high voltage instability, in accordance with the present disclosure.

In the present disclosure, a non-limiting embodiment in which enhanced surface area materials may be used is described with respect to FIG. 1. Variations of the placement of the enhanced surface area material are described with respect to FIGS. 2-5. With the foregoing in mind, FIG. 1 illustrates an embodiment of an X-ray tube 10 that may include features configured to provide enhanced trapping of liquid metal bearing material in accordance with the present approaches. In the illustrated embodiment, the X-ray tube 10 includes an anode assembly 12 and a cathode assembly 14. The X-ray tube 10 is supported by the anode and cathode assemblies within an envelope 16 defining an area of relatively low pressure (e.g., a vacuum) compared to ambient, in which high voltages may be present. The envelope 16 may be within a casing (not shown) that is filled with a cooling medium, such as oil, that surrounds the envelope 16. The cooling medium may also provide high voltage insulation.

The anode assembly 12 generally includes a rotor 18 and a stator outside of the X-ray tube 10 (not shown) at least partially surrounding the rotor 18 for causing rotation of an anode 20 during operation. The anode 20 is supported in rotation by a bearing 22, which, when rotated, also causes the anode 20 to rotate. The anode 20 has an annular shape, such as a disc, and an annular opening in the center thereof for receiving the bearing 22. In general, the bearing 22 includes a stationary portion, such as a shaft 24 and a rotary portion, such as a bearing sleeve 26 to which the anode 20 is attached. While the shaft 24 is presently described in the context of a stationary shaft, it should be noted that the present approaches are also applicable to embodiments wherein the shaft 24 is a rotary shaft. In such a configuration, it should be noted that the X-ray target would rotate as the shaft rotates. Keeping the foregoing in mind, in one embodiment, the bearing 22 may be a spiral groove bearing having a liquid metal lubricant disposed between the bearing sleeve 26 and the shaft 24. Indeed, some embodiments of the bearing 22 may conform to those described in U.S. patent application Ser. No. 12/410518 entitled "INTERFACE FOR LIQUID METAL BEARING AND METHOD OF MAKING SAME," filed on Mar. 25, 2009, the full disclosure of which is incorporated by reference herein in its entirety. The shaft 24 may optionally include a coolant flow path 28 through which a coolant, such as oil, may flow so as to cool the bearing 22. In the illustrated embodiment, the coolant flow path 28 extends along a longitudinal length of the X-ray tube 10, which is depicted as a straddle configuration. However, it should be noted that in other embodiments, the coolant flow path 28 may extend through only a portion of the X-ray tube 10, such as in configurations where the X-ray tube 10 is cantilevered when placed in an imaging system.

During operation, rotation of the bearing 22 advantageously allows a front portion of the anode 20, which has a target or focal surface 30 formed thereon, to be periodically struck by an electron beam 32, rather than continuously. Such periodic bombardment may allow the resulting thermal energy to be dispersed, rather than concentrated, which may result in one or more anode failure modes (e.g., cracking, deformation, rupture). Generally, the anode 20 may be rotated at a high speed (e.g., 100 to 200 Hz). The anode 20 may be manufactured to include a number of metals or composites, such as tungsten, molybdenum, copper, or any material that contributes to Bremsstrahlung (i.e., deceleration radiation) when bombarded with electrons. The anode's surface material is typically selected to have a relatively high refractory value so as to withstand the heat generated by electrons impacting the anode 20. Further, the space between the cathode assembly 14 and the anode 20 may be evacuated in order to minimize electron collisions with other atoms and to maximize an electric potential. In some X-ray tubes, voltages in excess of 20 kV are created between the cathode assembly 14 and the anode 20, causing electrons emitted by the cathode assembly 14 to become attracted to the anode 20. This voltage that may be deleteriously affected by the presence of stray atoms and/or particulates, such as atoms and/or particulates of liquid metal bearing material.

The electron beam 32 is produced by the cathode assembly 14 and, more specifically, a cathode 34 that receives one or more electrical signals via a series of electrical leads 36. The electrical signals may be timing/control signals that cause the cathode 34 to emit the electron beam 32 at one or more energies and at one or more frequencies. Further, the electrical signals may at least partially control the potential between the cathode 34 and the anode 20. The cathode 34 includes a central insulating shell 38 from which a mask 40 extends. The mask 40 encloses the leads 36, which extend to a cathode cup 42 mounted at the end of the mask 40. In some embodiments, the cathode cup 42 serves as an electrostatic lens that focuses electrons emitted from a thermionic filament within the cup 42 to form the electron beam 32.

As control signals are conveyed to cathode 34 via leads 36, the thermionic filament within cup 42 is heated and produces the electron beam 32. The beam 32 strikes the focal surface 30 of the anode 20 and generates X-ray radiation 46, which is diverted out of an X-ray aperture 48 of the X-ray tube 10. The direction and orientation of the X-ray radiation 46 may be controlled by a magnetic field produced outside of the X-ray tube 10, or through electrostatic means at the cathode 34, and the like. The field produced may generally shape the X-ray radiation 46 into a focused beam, such as a cone-shaped beam as illustrated. The X-ray radiation 46 exits the tube 10 and is generally directed towards a subject of interest during examination procedures.

As noted above, the X-ray tube 10 may be utilized in systems where the X-ray tube 10 is displaced relative to a patient, such as in CT imaging systems where the source of X-ray radiation rotates about a subject of interest on a gantry. As the X-ray tube 10 rotates along the gantry, various forces, such as centrifugal forces, are placed on the bearing 22. The load on the bearing 22 may, in certain situations, cause the bearing 22 to lose a portion of liquid metal bearing material. For example, the bearing 22 may slightly expand and a portion of the liquid metal bearing material may escape. To mitigate the effect of such leakage, the present embodiments provide one or more features to trap the liquid metal bearing material that has escaped.

Figure 2:
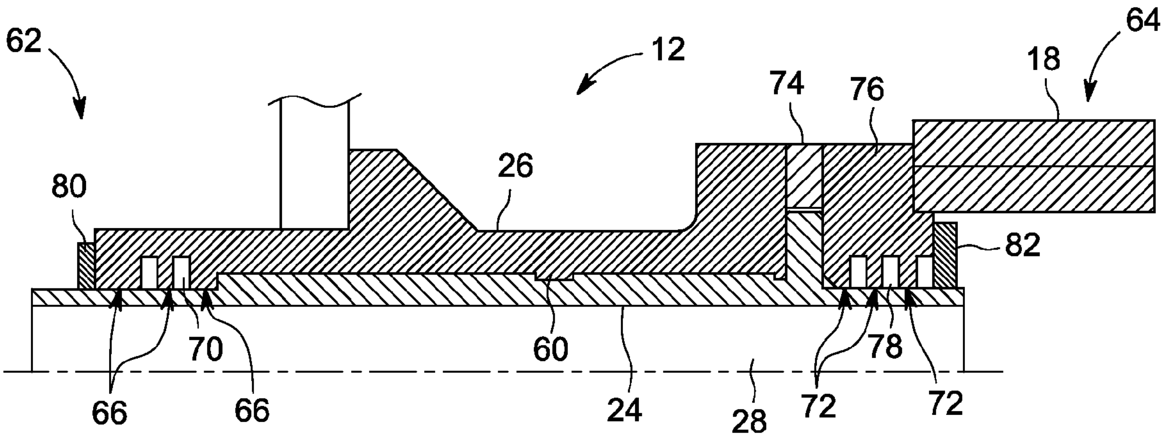
FIG. 2 is a cross-sectional view of the anode assembly of the X-ray tube of FIG. 1 having enhanced surface area materials disposed therein for preventing leakage of liquid metal bearing material, in accordance with the present disclosure.

FIG. 2 provides a cross-sectional view of an embodiment of a portion of the anode assembly 12 that may include liquid metal bearing material trapping features. As noted above, the anode assembly 12 includes a bearing 22 that allows the anode 20 (FIG. 1) to rotate. In the illustrated embodiment, the bearing 22 is a spiral groove bearing formed between the bearing sleeve 26 and the shaft 24. The bearing 22 is lubricated using a liquid metal bearing material, which may include Ga and/or its alloys. The liquid metal bearing material generally resides in an area 60 between the bearing sleeve 26 and shaft 24, and, during operation, may escape the bearing 22 at a first end 62 of the bearing 22 and/or at a second end 64 of the bearing 22. The first end 62 is generally towards the direction of the anode 20 (FIG. 1), while the second end 64 is generally towards the rotor 18 (FIG. 1). A first set of seals 66, which may include one or more rotatable members, is disposed at the first end 62. As illustrated, the first set of seals 66 are part of a one-piece rotatable member having protrusions that, when placed over the shaft 24, forms the seals. The first set of seals 66 may be considered small gaps that are configured to trap liquid metal bearing material that escapes from the bearing 22 via surface tension. As an example, the first set of seals 66 may include very small gaps with anti-wetting surfaces, which causes the liquid metal bearing material to be repelled by surface tension forces between the anti-wetting surface and the liquid metal bearing material. The first set of seals 66 is secured to the bearing sleeve 26 (e.g., via seal bolts) so as to cause rotation of the first set of seals 66 as the bearing 22 rotates. In addition to the first set of seals 66, one or more circumferential recesses 70 may be present that are configured to capture liquid metal bearing material that may escape the small gaps. For example, the liquid metal bearing material may experience centrifugal force during rotation of the bearing 22, which may force it to be directed past the first set of seals 66 and into one or more of the circumferential recesses 70. Moreover, in some embodiments, the circumferential recesses 70 may be coated and/or include one or more materials that are wettable by the liquid metal bearing material so as to provide a metallurgical interaction to increase retention forces. In this regard, the circumferential recesses may be considered liquid metal bearing material traps.

In addition to the first set of seals 66, the bearing sleeve 26 is also attached to a second set of seals 72 disposed at the second end 64 of the bearing 22. Specifically, the second set of seals 72 is attached to the bearing sleeve 26 via a spacer 74 separating the second set of seals 72 from the bearing sleeve 26. For example, assembly bolts may secure the bearing sleeve 26 to the spacer 74, and the spacer 74 to the second set of seals 72. However, it should be noted other configurations are contemplated herein, such as configurations where the bearing sleeve 26 is directly secured to the second set of seals 72, and the like. The second set of seals 72, like the first set of seals 66, is generally configured to trap liquid metal bearing material that has escaped the bearing 22 via capillary forces. As with the first end 62, the second end also includes one or more circumferential recesses 78 that may have a surface that is wettable by the liquid metal bearing material.

While the anode assembly 12 includes first set and second set of seals 66, 72 disposed on opposite ends of the bearing 22, it should be noted that liquid metal bearing material may still escape and cause high voltage instabilities within the X-ray tube 12. For example, the first and second sets of seals 66, 72 generally rely on the surface tension of the liquid metal bearing material to prevent leakage at low pressures due to small gaps and anti-wetting surfaces. However, in situations where there is a pressure spike, the first and second circumferential recesses 70, 78 may not be sufficient to capture the total amount of liquid metal bearing material that escapes the bearing 22 past the first and second sets of seals 66, 72, or may not be sufficient to capture atomized and/or vaporized liquid metal bearing material, or both. Accordingly, in addition to or in lieu of the circumferential recesses 70, 78, the present approaches also provide one or more annular members having enhanced surface area materials that are configured to trap escaped liquid metal bearing material. The trapping may involve mechanical trapping, for example due to the porous nature of the material, or metallic interaction, for example due to wettability of the enhanced surface area material with the liquid metal bearing material, or both.

Specifically, the anode assembly 12 includes a first enhanced surface area (ESA) ring 80 disposed towards the first end 62, in front of the first set of seals 66 (i.e., on an axially opposite end of the bearing 60). A second ESA ring 82 is disposed towards the second end 64, just behind the second set of seals 72 on an axially opposite end of the bearing 60. In a general sense, the first and second ESA rings 80, 82 may be configured to trap any liquid metal bearing material that escapes past the first and second sets of seals 66, 72, and, in some embodiments, the circumferential recesses 70, 78, respectively. The first and second ESA rings 80, 82 may be approximately the same size as, smaller than, or larger than the first and second sets of seals 66, 72. It should be noted, however, that the first and second ESA rings 80, 82 may be at least the same size as the circumferential recesses to which they are disposed proximate. As illustrated, the first ESA ring 80 is approximately the same size as the circumferential recesses 70, and the second ESA ring 82 is larger than the circumferential recesses 78. However, it should be noted that other sizes and configurations are also contemplated herein, as will be discussed with respect to FIGS. 2-5. The first and second ESA rings 80, 82 may be full rings, or partial rings, and generally include an annular opening so as to receive the shaft 24. The first and second ESA rings 80, 82 may be directly attached to the shaft 24, or may be attached to other components of the anode assembly 12. In some embodiments, the first and second ESA rings 80, 82 may be pressed-in or fit so as to substantially limit axial motion (e.g., toward and away from the first and second ends 62, 64). Moreover, the first and second ESA rings 80, 82 may be constructed of materials that are stable at the operating conditions of the X-ray tube 10.

The first and second ESA rings 80, 82 may be formed from a variety of materials and a variety of processes. For example, the first and second ESA rings 80, 82 may include materials that are wettable by the liquid metal bearing material, such as gold (Au), silver (Ag), copper (Cu), nickel (Ni), and the like.

Alternatively or additionally, the first and second ESA rings 80, 82 may include materials that are substantially non-wettable by the liquid metal bearing material, such as graphite and the like. It should be noted that such materials that are substantially non-wettable operate by providing a physical barrier. Moreover, either wettable or non-wettable ESA materials in accordance with the present approaches are designed so they are mechanically compliant and conform to the joint. Alternatively, non-compliant configurations in accordance with the present approaches will have no contact between the stationary and rotating members. The first and second ESA rings 80, 82 may be formed from a variety of processes, as noted above. In a general sense, the enhanced surface area material from which the first and second ESA rings 80, 82 are formed may include a mesh, wool, felt, woven material, foam, pressed/sintered material, and the like. In some embodiments, the enhanced surface area material may be produced by powder metallurgy, so as to produce a material with small pores (e.g., micropores). In a general sense, the first and second ESA rings 80, 82 are configured such that any escaped liquid metal bearing material becomes trapped within the pores or fibrous network of the enhanced surface area material. In embodiments where the enhanced surface area material includes a material that is wettable by the liquid metal bearing material, the first and second ESA rings 80, 82 may be considered mechanical and metallurgical sinks for the escaped liquid metal bearing material.

Figure 3:
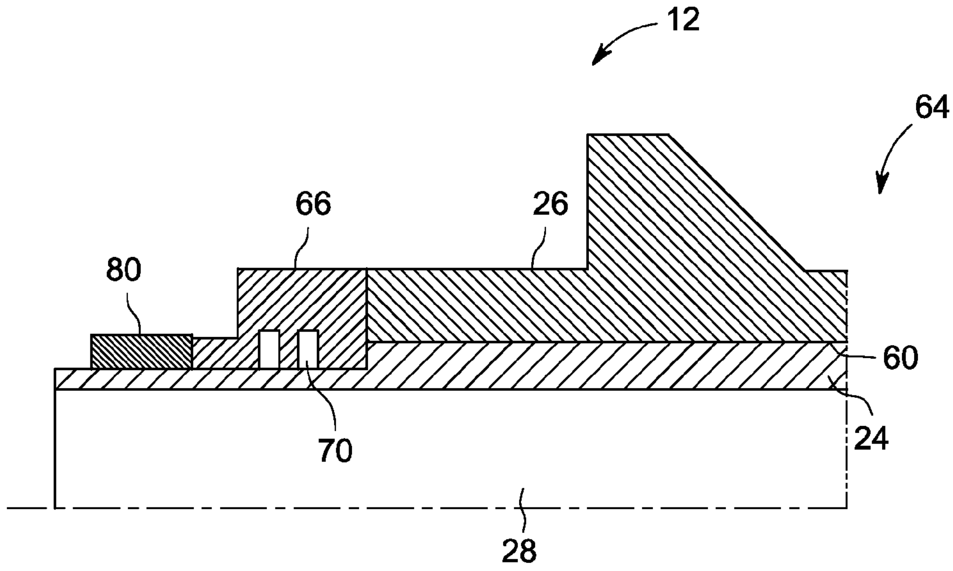
FIG. 3 is a cross-sectional view of one end of the anode assembly of the X-ray tube of FIG. 1 having an enhanced surface area material disposed proximate a bearing seal for preventing leakage of liquid metal bearing material, in accordance with the present disclosure.

FIG. 3 illustrates an embodiment of the first ESA ring 80, wherein its size is larger than the circumferential recesses 70. It should be noted that while the first ESA ring 80 does not completely cover the first set of seals 66, such embodiments are also contemplated herein. During operation of the illustrated embodiment and in situations where liquid metal bearing material escapes the bearing 60, a portion of the liquid metal bearing material may move from the second end 64 (e.g., from an area proximate the center of the shaft 24) towards the first end 62. In such situations, the liquid metal bearing material may first encounter the circumferential recesses 70 of the first set of seals 66. However, as noted above, at least a portion of the escaped liquid metal bearing material may not be completely retained by the first set of seals 66. Moreover, some of the liquid metal bearing material may be in atomized and/or vaporized form. Advantageously, the first ESA ring 80 may contain pores of sufficient size so as to trap the liquid metal bearing material even when in atomized/vaporized form. As noted above, the first ESA ring 80 may be a metal wool, a metal foam, a sintered metal, a woven metal, a porous graphite, and so on. Additionally, the first ESA ring 80 may be a partial ring that is able to be disposed over the shaft 24 from the side, or may be a full annular ring that has an annular opening so as to receive the shaft 24 through its center, and so on.

While the first ESA ring 80 is illustrated as being a separate from the first set of seals 66, it should be noted that in other embodiments, the first ESA ring 80 may be formed as part of the first set of seals 66. For example, the first set of seals 66 may include a combination of the circumferential recesses 70 and an enhanced surface area material. Alternatively, the first set of seals 66 may have the first ESA ring 80 disposed in one of the circumferential recesses 70, for example at a circumferential recess disposed towards the first end 62. In other embodiments, the first ESA ring 80 may be secured to the first set of seals 66. For example, the first ESA ring 80 may be press fit into the first set of seals 66, may interlock with the first set of seals 66, or may be bolted onto the first set of seals 66.

Figure 4:
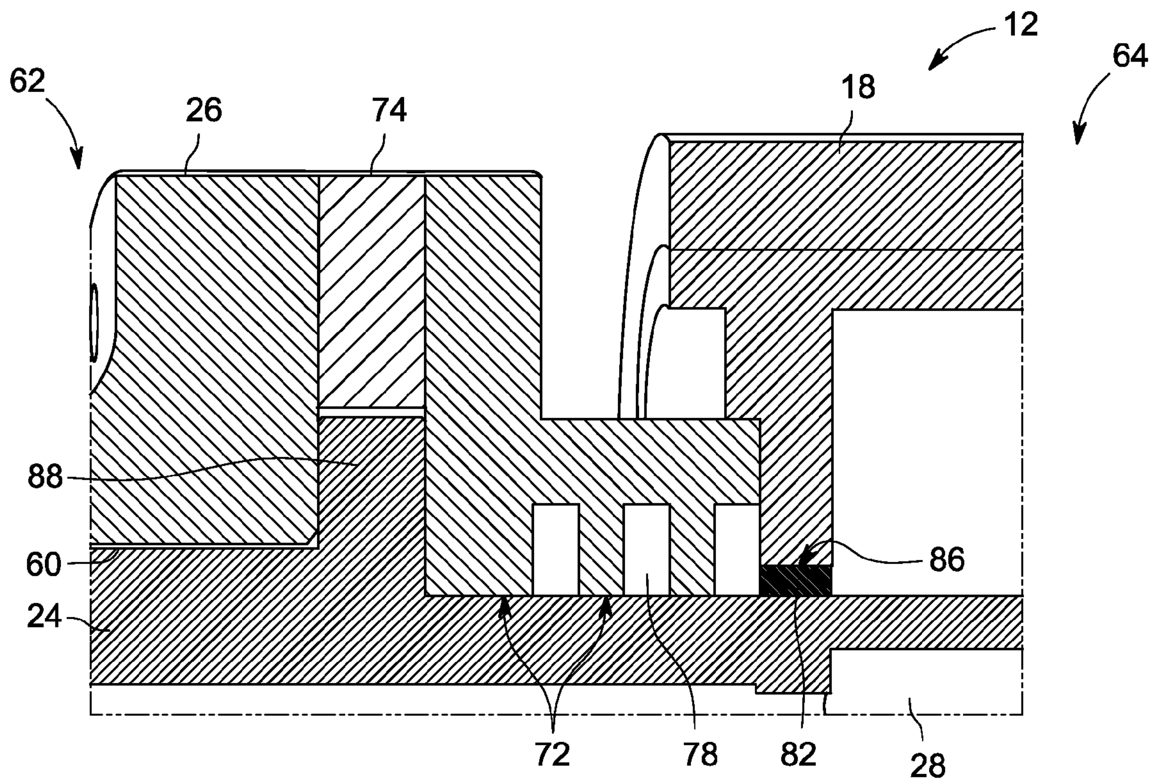
FIG. 4 is a cross-sectional view of one end of the anode assembly of the X-ray tube of FIG. 1 having an enhanced surface area material disposed proximate a thrust seal for preventing leakage of liquid metal bearing material, in accordance with the present disclosure.
Figure 5:
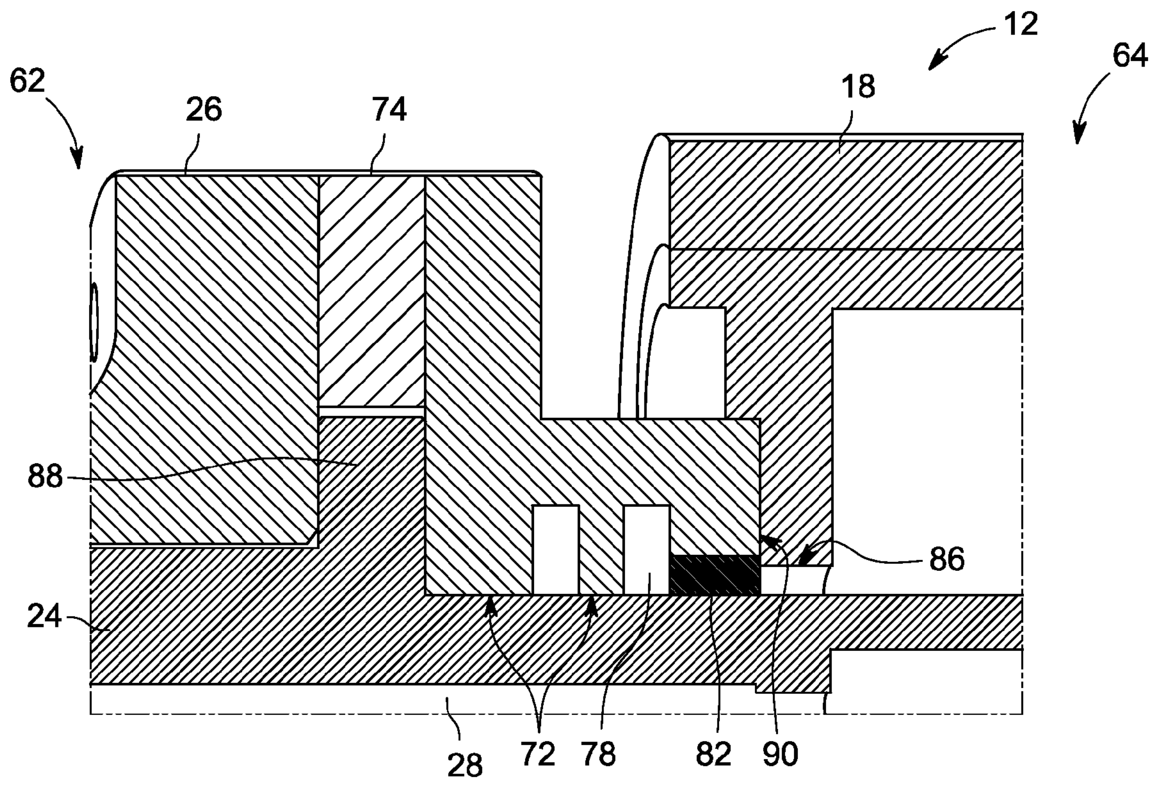
FIG. 5 is a cross-sectional view of one end of the anode assembly of the X-ray tube of FIG. 1 having an enhanced surface area material integrated with a thrust seal for preventing leakage of liquid metal bearing material, in accordance with the present disclosure.

Moving now to FIG. 4, an embodiment of the second ESA ring 82 is illustrated wherein it is approximately the same size as the circumferential recesses 78. The second ESA ring 82, as depicted, may be sized so as to extend fully along an inner face 86 of the rotor 18. Therefore, it may be appreciated from the illustration of FIG. 4 that the second ESA ring 82 may prevent the ingress of liquid metal bearing material into a portion of the rotor 18.

As an example, during operation of the X-ray tube 10, the bearing sleeve 26 may rotate about the shaft 24. In embodiments where a load is placed on the bearing 60, a portion of the liquid metal bearing material may escape from the bearing area, for example in a direction from the first end 62 towards the second end 64. The escaped liquid metal bearing material may then travel past the spacer 74, which may also be a seal against a shoulder 88 of the bearing sleeve 26. It is presently contemplated that the spacer 74 may also beneficially include one or more enhanced surface area materials. As the liquid metal bearing material progresses through the anode assembly 12, it then encounters the second set of seals 72. The second set of seals 72, as noted above, is secured to the spacer 74. Accordingly, the liquid metal bearing material, having passed through the interface between the spacer 74 and the shoulder 88, then moves through the interface between the spacer 74 and the second set of seals 72, and on to the circumferential recesses 78.

The liquid metal bearing materials that are not trapped within the circumferential recesses 78, for example atomized and/or vaporized bearing materials, then encounter the second ESA ring 82. According to present embodiments, the second ESA ring 82, like the first ESA ring 80, may be made from a material that is either wettable or substantially non-wettable by the liquid metal bearing material. As an example, the second ESA ring 82 may include Au, Cu, Ni, graphite, and so on. The second ESA ring 82 may be formed using a variety of methods known in the art, including powder metallurgy, pressing, sintering, weaving, drawing, and so on. In some embodiments, the second ESA ring 82 is a mechanical trap, wherein it contains a mesh-like or foam-like structure that may absorb liquid metal bearing materials. Further, in embodiments where the second ESA ring 82 is wettable, it may be considered a mechanical and metallurgical sink for escaped liquid metal bearing material.

In a similar manner to the first ESA ring 80, the second ESA ring 82 may be separate from, or connected to the seals to which it is proximately disposed. In the embodiment illustrated in FIG. 5, the second ESA ring 82 is depicted as integral with the second set of seals 72. As an example, the second ESA ring 82 may be press-fit, interlocked, or otherwise secured to the second set of seals 72. In some embodiments, which may be appreciated with respect to FIG. 5, the second ESA ring 82 may altogether replace one or more of the circumferential recesses. Moreover, as the liquid metal bearing material encounters the second set of seals 72, it may also encounter the second ESA ring 82. Indeed, the use of multiple enhanced surface area materials, such as a plurality of rings, is contemplated herein.

In some embodiments, to generate the second set of seals 72 having an integral enhanced surface area material, a portion of the second set of seals 72 may be chemically treated. Such chemical treatment of a portion of the second set of seals 72 may generate an annular or semi-annular formation having enhanced surface area compared to the bulk of the second set of seals 72. In other embodiments, the second ESA ring 82 may be manufactured based on the tolerances of one or more of the circumferential recesses 78. Manufacturing the second ESA ring 82 in this way allows an existing anode assembly 12 to be retrofitted with an enhanced surface area material in accordance with the present approaches. Indeed, the present approaches contemplate the manufacture of the first and/or second ESA rings 80, 82 so as to allow retrofitting into existing X-ray tubes.

Figure 6:
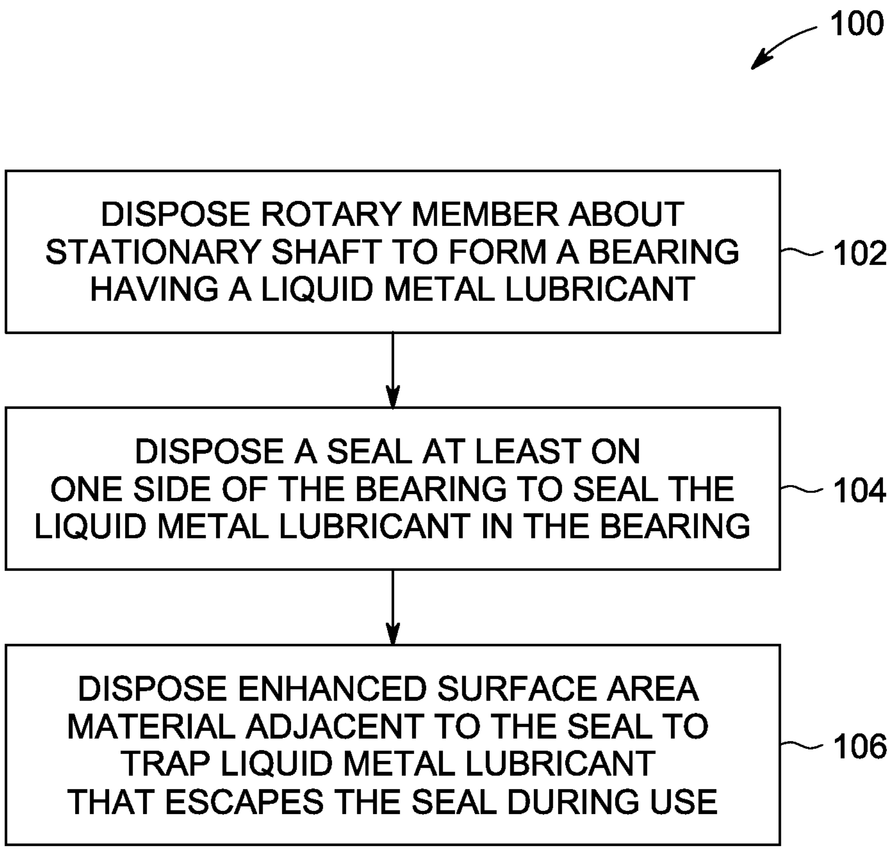
FIG. 6 is a process flow diagram illustrating an embodiment of a method for manufacturing an X-ray tube having one or more enhanced surface area materials for preventing high voltage instability, in accordance with the present disclosure.

FIG. 6 is an illustration of a process flow diagram of such a method 100 for manufacturing an X-ray tube in accordance with present embodiments. The method 100 begins with the formation of the bearing 60 (FIG. 2) to which supports the anode 20 (FIG. 1) in rotation. A rotary member, such as the bearing sleeve 26 of FIGS. 1-5, is disposed about a shaft, such as shaft 24 of FIGS. 1-5 (block 102). Together, the bearing sleeve 26 and the shaft 24 form the bearing 60, which in the present embodiments is lubricated with a material that is metallic and liquid at room temperature (i.e., a liquid metal bearing material). A seal, such either or both of the first and second seals 66, 72 (FIG. 2) are disposed on a side of the bearing 60 so as to prevent leakage of the liquid metal bearing material out of the bearing 60 (block 104). Proximate (e.g., directly against) the seal is disposed an enhanced surface area material (e.g., either or both of the first and second ESA rings 80, 82) on a side that is axially opposite from the bearing 60 (block 106). In this way, the enhanced surface area material is present so as to trap any liquid metal bearing material that escapes the seal. The enhanced surface area material may be directly attached to the shaft, or to the seal. For example, the enhanced surface area material may be an annular or semi-annular structure having an annular opening proximate its center. The opening allows the enhanced surface area material to be disposed about the shaft so as to form a seal to prevent further leakage of the liquid metal bearing material. In embodiments where the enhanced surface area material is attached to the seal, it may include one or more features configured to interlock with the seal, or may be manufactured such that its extents approximate one or more tolerances (e.g., of the circumferential recesses 70, 78) of the seal.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An X-ray tube comprising:

a stationary member;

a rotary member configured to rotate with respect to the stationary member during operation of the X-ray tube;

a liquid metal bearing material disposed in a space between the stationary member and the rotary member;

a first seal disposed adjacent to the space to seal the liquid metal bearing material in the space; and a first structure comprising a first enhanced surface area material disposed on a side of the first seal axially opposite the space and configured to trap within the first enhanced surface area material liquid metal bearing material that escapes the first seal, wherein the first structure is physically separate from the first seal, and an entirety of the first structure is disposed about the stationary member axially offset along a longitudinal axis of the stationary member from an entirety of the rotary member.

2. The X-ray tube of claim 1, comprising a second seal disposed at an end of the space, and a second structure comprising a second enhanced surface area material disposed on a side of the second seal opposite the space to trap within the second enhanced surface area material liquid metal bearing material that escapes the second seal.

3. The X-ray tube of claim 1, wherein the the first structure comprises an annular ring.

4. The X-ray tube of claim 1, wherein the first enhanced surface area material comprises a porous material.

5. The X-ray tube of claim 4, wherein the first enhanced surface area material comprises a metal wool, a sintered metal, or a metal foam.

6. The X-ray tube of claim 4, wherein the first enhanced surface area material comprises a graphite-based material.

7. The X-ray tube of claim 1, wherein the first enhanced surface area material is secured to the rotary member.

8. The X-ray tube of claim 1, wherein the first structure is secured to the stationary member.

9. The X-ray tube of claim 1, wherein the first structure contacts both the stationary member and the rotary member.

10. The X-ray tube of claim 1, wherein the first enhanced surface area material comprises a material selected for enhanced wettability by the liquid metal bearing material.

11. The X-ray tube of claim 10, wherein the first enhanced surface area material comprises at least one of gold, copper, or nickel.

12. The X-ray tube of claim 1, wherein the first enhanced surface area material is reactive with the liquid metal bearing material.

13. The X-ray tube of claim 1, comprising a surface material disposed over at least a portion of the first enhanced surface area material and configured to provide enhanced wettability by the liquid metal bearing material.

14. An X-ray tube comprising:

a stationary member;

a rotary member configured to rotate with respect to the stationary member during operation of the X-ray tube;

a liquid metal bearing material disposed in a space between the stationary member and the rotary member;

a first seal disposed adjacent to a first end of the space to seal the liquid metal bearing material in the space;

a second seal disposed adjacent to a second end of the space to seal the liquid metal bearing material in the space;

a first ring disposed adjacent to the first seal and made of a first enhanced surface area material to trap within the first ring liquid metal bearing material that escapes the first seal, wherein the first ring is physically separate from the first seal, and an entirety of the first ring is disposed about the stationary member axially offset along a longitudinal axis of the stationary member from an entirety of the rotary member; and a second ring disposed adjacent to the second seal and made of a second enhanced surface area material to trap within the second ring liquid metal bearing material that escapes the second seal, wherein the second ring is physically separate from the second seal.

15. A method for making an X-ray tube, comprising:

disposing a sleeve about a shaft;

disposing a liquid metal bearing material in a space between the sleeve and the shaft;

disposing a first seal adjacent to at least one end of the space to seal the liquid metal bearing material in the space; and disposing a first structure comprising a first enhanced surface area material adjacent to the first seal to trap within the first enhanced surface area material liquid metal bearing material that escapes the first seal, wherein the first structure is physically separate from the first seal, and an entirety of the first structure is disposed about the shaft axially offset along a longitudinal axis of the shaft from an entirety of the sleeve.

16. The method of claim 15, comprising disposing a second seal at an end of the space, and disposing a second structure comprising a second enhanced surface area material on a side of the second seal opposite the space to trap within the second enhanced surface area material liquid metal bearing material that escapes the second seal.

17. The method of claim 15, wherein the first structure comprises an annular ring.

18. The method of claim 15, wherein the first enhanced surface area material comprises a porous material.

19. A method for making an X-ray tube, comprising:

in an X-ray tube comprising a rotary member disposed about a stationary member, a liquid metal bearing material in a space between the rotary member and the stationary member, and a seal disposed adjacent to at least one end of the space to seal the liquid metal bearing material in the space, disposing a structure comprising an enhanced surface area material adjacent to the seal to trap within the enhanced surface area material liquid metal bearing material that escapes the seal, wherein the structure is physically separate from the seal, and an entirety of the structure is disposed about the stationary member axially offset along a longitudinal axis of the stationary member from an entirety of the rotary member.

20. The method of claim 19, wherein the structure comprises an annular ring.

* * * * *